(12) United States Patent
Fukudome et al.

(10) Patent No.: US 12,031,531 B2
(45) Date of Patent: Jul. 9, 2024

(54) CAPACITY CONTROL VALVE

(71) Applicant: EAGLE INDUSTRY CO., LTD., Tokyo (JP)

(72) Inventors: Kohei Fukudome, Tokyo (JP); Masahiro Hayama, Tokyo (JP); Takahiro Ejima, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 101 days.

(21) Appl. No.: 17/603,291

(22) PCT Filed: Apr. 21, 2020

(86) PCT No.: PCT/JP2020/017168
§ 371 (c)(1),
(2) Date: Oct. 12, 2021

(87) PCT Pub. No.: WO2020/218284
PCT Pub. Date: Oct. 29, 2020

(65) Prior Publication Data
US 2022/0213878 A1 Jul. 7, 2022

(30) Foreign Application Priority Data
Apr. 24, 2019 (JP) .................................. 2019-082964

(51) Int. Cl.
*F04B 27/18* (2006.01)
*F16K 31/06* (2006.01)

(52) U.S. Cl.
CPC ...... *F04B 27/1804* (2013.01); *F16K 31/0613* (2013.01); *F16K 31/0655* (2013.01);
(Continued)

(58) Field of Classification Search
None
See application file for complete search history.

(56) References Cited

U.S. PATENT DOCUMENTS

| 3,765,644 A | 10/1973 | Zeuner | ................ F16K 31/0655 |
| 4,291,860 A | 9/1981 | Bauer | ................. F16K 31/0655 |

(Continued)

FOREIGN PATENT DOCUMENTS

| CN | 2869383 | 2/2007 | .............. F04B 49/22 |
| CN | 102384056 | 3/2012 | .............. F04B 27/14 |

(Continued)

OTHER PUBLICATIONS

Chinese Official Action issued in related Chinese Application Serial No. 202080026556.1, dated Oct. 9, 2022, 9 pages.

(Continued)

*Primary Examiner* — Matthew W Jellett
(74) *Attorney, Agent, or Firm* — HAYES SOLOWAY P.C.

(57) ABSTRACT

A capacity control valve includes: a valve housing provided with a suction port through which a suction fluid of a suction pressure passes and a control port through which a control fluid of a control pressure passes; a CS valve that includes a CS valve element which is axially driven by a solenoid and a CS valve seat provided between the suction port and the control port and is brought into contact with and separated from the CS valve element; and bias means for biasing the CS valve element in a valve closing direction of the CS valve, wherein a space is formed inside the valve housing in opposition to the solenoid through the CS valve element and the suction fluid flows into the space.

6 Claims, 9 Drawing Sheets

(52) U.S. Cl.
CPC .............. *F04B 2027/1813* (2013.01); *F04B 2027/1827* (2013.01); *F04B 2027/1859* (2013.01)

(56) References Cited

U.S. PATENT DOCUMENTS

| | | | |
|---|---|---|---|
| 5,022,629 A | 6/1991 | Tibbals | B05B 1/3053 |
| 5,076,538 A | 12/1991 | Mohr | B60T 15/028 |
| 5,199,855 A * | 4/1993 | Nakajima | F04C 28/14 |
| | | | 417/310 |
| 5,277,552 A | 1/1994 | Higuchi | F04B 27/1804 |
| 5,401,087 A | 3/1995 | Goossens | F16J 15/56 |
| 5,503,184 A | 4/1996 | Reinartz | B60T 8/367 |
| 6,142,445 A | 11/2000 | Kawaguchi | F16K 31/0613 |
| 6,217,292 B1 | 4/2001 | Ota | F04B 27/1804 |
| 6,234,763 B1 | 5/2001 | Ota et al. | 417/222.2 |
| 6,244,159 B1 | 6/2001 | Kimura et al. | F01B 3/02 |
| 6,250,600 B1 | 6/2001 | Kumagai | G05D 16/0619 |
| 6,350,106 B1 | 2/2002 | Shimizu | F04B 27/1804 |
| 6,398,516 B1 | 6/2002 | Kawaguchi et al. | 417/222.2 |
| 6,443,708 B1 | 9/2002 | Hirota | F04B 27/1804 |
| 6,481,976 B2 | 11/2002 | Kimura | F04B 27/1804 |
| 6,585,494 B1 * | 7/2003 | Suzuki | F25B 9/008 |
| | | | 417/222.2 |
| 6,644,621 B2 | 11/2003 | Ji | B60T 13/686 |
| 6,772,990 B2 | 8/2004 | Sasaki et al. | F04B 49/00 |
| 6,893,215 B2 | 5/2005 | Kuwabara et al. | F01D 25/26 |
| 6,976,665 B2 | 12/2005 | Seitz | B60T 8/363 |
| 7,014,427 B1 | 3/2006 | Hirota | 417/218 |
| 8,418,723 B2 | 4/2013 | Tsuchiya | F16K 31/0655 |
| 8,550,427 B2 | 10/2013 | Yoshida | B60T 8/363 |
| 9,334,978 B2 | 5/2016 | Lappan | F04C 2/3442 |
| 9,581,149 B2 | 2/2017 | Ota et al. | F04B 27/1804 |
| 9,651,037 B2 | 5/2017 | Sakakibara | F04B 1/26 |
| 10,077,849 B2 | 9/2018 | Iwa et al. | F16K 31/06 |
| 10,316,975 B2 | 6/2019 | Fangauer | F16K 1/38 |
| 10,781,804 B2 | 9/2020 | Higashidozono | F04B 27/18 |
| 10,823,162 B2 | 11/2020 | Kume et al. | F04B 27/18 |
| 10,837,431 B2 | 11/2020 | Tonegawa et al. | F04B 27/18 |
| 10,907,624 B2 | 2/2021 | Kume et al. | F04B 27/18 |
| 11,215,293 B2 | 1/2022 | Fukuda | F04B 53/10 |
| 11,231,111 B2 | 1/2022 | Hurst | F04B 53/102 |
| 11,320,061 B2 | 5/2022 | Nishimura et al. | F16K 31/06 |
| 11,480,166 B2 | 10/2022 | Hayama | F04B 27/10 |
| 2002/0031432 A1 | 3/2002 | Ota et al. | F04B 1/26 |
| 2002/0098091 A1 | 7/2002 | Umemura | F04B 27/1804 |
| 2003/0019226 A1 | 1/2003 | Hirota | F04B 27/1804 |
| 2004/0060604 A1 | 4/2004 | Uemura | G05D 16/2024 |
| 2004/0091368 A1 | 5/2004 | Kainuma | F04B 27/1804 |
| 2004/0118140 A1 | 6/2004 | Umemura et al. | F25B 41/04 |
| 2005/0287014 A1 | 12/2005 | Umemura et al. | F04B 1/26 |
| 2006/0237552 A1 | 10/2006 | Umemura | F16K 31/0655 |
| 2007/0069576 A1 | 3/2007 | Suzuki | B60T 8/363 |
| 2007/0164244 A1 | 7/2007 | Kratzer | F16K 31/0658 |
| 2007/0267078 A1 | 11/2007 | Collet et al. | F15B 13/04 |
| 2008/0175727 A1 * | 7/2008 | Umemura | F04B 27/1804 |
| | | | 251/129.01 |
| 2011/0042605 A1 | 2/2011 | Gyger | F16K 25/005 |
| 2011/0091334 A1 | 4/2011 | Taguchi | F04B 27/1804 |
| 2012/0056113 A1 | 3/2012 | Tano et al. | F16K 31/12 |
| 2013/0291963 A1 | 11/2013 | Futakuchi et al. | B60H 1/00 |
| 2014/0369862 A1 | 12/2014 | Ota et al. | F04B 27/1804 |
| 2015/0044065 A1 | 2/2015 | Ota et al. | F04B 27/18 |
| 2015/0211502 A1 | 7/2015 | Ota et al. | F04B 7/0076 |
| 2015/0345655 A1 | 12/2015 | Higashidozono | F04B 27/1804 |
| 2016/0053755 A1 | 2/2016 | Taguchi | F04B 27/1804 |
| 2016/0186733 A1 | 6/2016 | Sugamura et al. | F04B 27/1804 |
| 2017/0175723 A1 | 6/2017 | Kume | F04B 27/1804 |
| 2017/0314700 A1 | 11/2017 | Iwanaga et al. | F16K 31/0675 |
| 2019/0331249 A1 | 10/2019 | Borja | F16K 1/44 |

FOREIGN PATENT DOCUMENTS

| | | | |
|---|---|---|---|
| CN | 103671033 | 3/2014 | F04B 39/08 |
| CN | 105736308 | 7/2016 | F04B 39/00 |
| CN | 109416133 | 3/2019 | F16K 31/06 |
| EP | 0255764 | 7/1987 | F04B 1/28 |
| EP | 0945617 | 9/1999 | F04B 27/18 |
| EP | 0945618 | 9/1999 | F04B 27/18 |
| EP | 0980976 | 2/2000 | F04B 27/18 |
| EP | 1091125 | 4/2001 | F04B 27/18 |
| EP | 1098091 | 5/2001 | F04B 27/18 |
| EP | 1052124 | 11/2002 | B60H 1/32 |
| EP | 1279831 | 1/2003 | F04B 27/18 |
| EP | 1375918 | 1/2004 | F04B 27/18 |
| EP | 1512871 | 3/2005 | F04B 27/18 |
| EP | 2952741 | 12/2015 | F16K 31/06 |
| EP | 2963293 | 1/2016 | F04B 27/10 |
| GB | 787961 | 12/1957 | F04B 43/067 |
| JP | 7-27049 | 1/1995 | F04B 24/10 |
| JP | 2000-87849 | 3/2000 | F04B 27/14 |
| JP | 2000-161234 | 6/2000 | F04B 49/00 |
| JP | 3242496 | 10/2001 | F04B 27/14 |
| JP | 2002-70732 | 3/2002 | F04B 27/14 |
| JP | 2002-201913 | 7/2002 | F01D 11/00 |
| JP | 2003-322086 | 11/2003 | F04B 49/00 |
| JP | 2004162856 | 6/2004 | F16K 31/06 |
| JP | 3581598 | 7/2004 | F04B 29/10 |
| JP | 2006-17087 | 1/2006 | F04B 27/14 |
| JP | 2006-52648 | 2/2006 | F04B 27/14 |
| JP | 3783434 | 3/2006 | F04B 27/14 |
| JP | 2007177627 | 7/2007 | F04B 27/14 |
| JP | 4100161 | 6/2008 | F16H 61/00 |
| JP | 2011017381 | 1/2011 | F16H 61/00 |
| JP | 2011-94554 | 5/2011 | F04B 27/14 |
| JP | 2014-80927 | 5/2014 | F04B 27/14 |
| JP | 2014-126025 | 7/2014 | F04B 27/14 |
| JP | 2015-1168 | 1/2015 | F04B 27/14 |
| JP | 2015-34510 | 2/2015 | F04B 27/14 |
| JP | 201620682 | 2/2016 | F04B 27/14 |
| JP | 5983539 | 8/2016 | |
| JP | 2017-31834 | 2/2017 | F04B 27/18 |
| JP | 2018-3884 | 1/2018 | F16K 31/06 |
| JP | 2018179087 | 11/2018 | F16K 31/06 |
| JP | 2019143781 | 8/2019 | F16K 11/07 |
| WO | WO2005095796 | 10/2005 | F04B 27/14 |
| WO | WO2012/077439 | 6/2012 | F04B 27/14 |
| WO | WO2015093502 | 6/2015 | F04B 49/80 |
| WO | WO2017057160 | 4/2017 | F04B 27/18 |
| WO | WO2018061380 | 4/2018 | F04B 27/18 |
| WO | WO2019102909 | 5/2019 | F16K 31/06 |
| WO | WO2013005538 | 1/2023 | F16K 17/06 |

OTHER PUBLICATIONS

Chinese Official Action issued in related Chinese Application Serial No. 202080026542.X, dated Oct. 8, 2022, 9 pages.
Chinese Official Action issued in related Chinese Application Serial No. 202080026419.8, dated Sep. 29, 2022, 10 pages.
Chinese Official Action issued in related Chinese Application Serial No. 202080026977.4 dated Oct. 21, 2022, 11 pages.
European Search Report issued in related European Patent Application Serial No. 20783904.4, dated Oct. 19, 2022, 7 pages.
European Search Report issued in related European Patent Application Serial No. 20795975.0, dated Oct. 19, 2022, 7 pages.
European Search Report issued in related European Patent Application Serial No. 20795023, dated Dec. 5, 2022, 9 pages.
European Search Report issued in related European Patent Application Serial No. 20782343, dated Oct. 18, 2022, 8 pages.
European Search Report issued in related European Patent Application Serial No. 20782596, dated Nov. 2, 2022, 9 pages.
European Search Report issued in related European Patent Application Serial No. 20785209, dated Oct. 27, 2022, 8 pages.
U.S. Appl. No. 17/599,520, filed Sep. 28, 2020, Hayama et al.
U.S. Appl. No. 17/600,529, filed Sep. 30, 2020, Hayama et al.
U.S. Appl. No. 17/599,474, filed Sep. 28, 2020, Hayama et al.
U.S. Appl. No. 17/599,467, filed Sep. 28, 2020, Hayama et al.
U.S. Appl. No. 17/603,291, filed Oct. 12, 2021, Fukudome et al.
U.S. Appl. No. 17/603,284, filed Oct. 12, 2021, Hayama et al.
Official Action issued in related U.S. Appl. No. 17/599,474, dated Mar. 2, 2023, 11 pages.

(56) References Cited

OTHER PUBLICATIONS

Official Action issued in related U.S. Appl. No. 17/599,467, dated Jan. 24, 2023, 11 pages.
Official Action issued in related U.S. Appl. No. 17/599,520, dated Jan. 30, 2023, 8 pages.
Chinese Official Action issued in related Chinese Application Serial No. 202080028782.3 dated Dec. 15, 2022, 10 pages.
Chinese Official Action issued in related Chinese Application Serial No. 202080028860.X dated Nov. 22, 2022, 12 pages.
International Preliminary Report on Patentability issued in PCT International Patent Application Serial No. PCT/JP2020/015177, dated Oct. 14, 2021 with translation (6 pgs).
International Search Report and Written Opinion issued in PCT International Patent Application Serial No. PCT/JP2020/015177, dated Jun. 23, 2020 with translation (14 pgs).
International Search Report and Written Opinion issued in PCT International Patent Application Serial No. PCT/JP2020/015179, dated Jun. 9, 2020 with translation (11 pgs).
International Preliminary Report on Patentability issued in PCT International Patent Application Serial No. PCT/JP2020/015179, dated Oct. 26, 2021 with translation (5 pgs).
International Search Report and Written Opinion issued in PCT International Patent Application Serial No. PCT/JP2020/017169, dated Jun. 16, 2020 with translation (12 pgs).
International Preliminary Report on Patentability issued in PCT International Patent Application Serial No. PCT/JP2020/017169, dated Nov. 4, 2021 with translation (5 pgs).
International Search Report and Written Opinion issued in PCT International Patent Application Serial No. PCT/JP2020/017168, dated Jun. 16, 2020 with translation (14 pgs).
International Preliminary Report on Patentability issued in PCT International Patent Application Serial No. PCT/JP2020/017168, dated Nov. 4, 2021 with translation (6 pgs).
International Search Report and Written Opinion issued in PCT International Patent Application Serial No. PCT/JP2020/015176, dated Jun. 23, 2020 with translation (12 pgs).
International Preliminary Report on Patentability issued in PCT International Patent Application Serial No. PCT/JP2020/015176, dated Oct. 14, 2021 with translation (5 pgs).
International Search Report and Written Opinion issued in PCT International Patent Application Serial No. PCT/JP2020/015180, dated Jun. 9, 2020 with translation (11 pgs).
International Preliminary Report on Patentability issued in PCT International Patent Application Serial No. PCT/JP2020/015180, dated Oct. 14, 2021 with translation (5 pgs).
Chinese Official Action issued in related application serial No. 202080026977.4, dated Apr. 20, 2023, 12 pages with translation.
Korean Official Action issued in related application serial No. 10-2021-7036305, dated Mar. 15, 2023, 8 pages with translation.
Official Action issued in related U.S. Appl. No. 17/603,284, dated May 3, 2023, 10 pages.
Official Action issued in related U.S. Appl. No. 17/599,467, dated May 10, 2023, 12 pages.
Chinese Official Action issued in related application serial No. 202080026419.8, dated May 24, 2023, 10 pages with translation.
Chinese Official Action issued in related application serial No. 202080026542.X, dated Mar. 16, 2023, 11 pages with translation.
Chinese Official Action issued in related application serial No. 202080026542.X, dated Aug. 29, 2023, 13 pages with translation.
Chinese Official Action issued in related application serial No. 202080026977.4, dated Aug. 25, 2023, 17 pages with translation.
Official Action issued in related U.S. Appl. No. 17/599,474, dated Jun. 27, 2023, 12 pages.
Official Action issued in related U.S. Appl. No. 17/603,284, dated Aug. 21, 2023, 13 pages.
Notice of Allowance issued in related U.S. Appl. No. 17/599,467, dated Aug. 8, 2023, 19 pages.
European Search Report issued in related application serial No. 23174587.8, dated Sep. 12, 2023, 14 pages.
European Search Report issued in related application serial No. 23180732.2, dated Oct. 18, 2023, 7 pages.
Official Action issued in related U.S. Appl. No. 17/599,474, dated Sep. 29, 2023, 12 pages.
Chinese Official Action issued in related Application No. 202080026977.4, dated Nov. 16, 2023 with translation, 18 pages.
Chinese Official Action issued in related Application No. 2020080026419.8, dated Dec. 1, 2023 with translation, 17 pages.
Japanese Official Action issued in related Application No. 2021-516128, dated Dec. 5, 2023 with translation, 8 pages.
Official Action issued in related U.S. Appl. No. 17/599,474, dated Dec. 14, 2023, 12 pages.
European Official Action issued in related Application No. 20795023.9, dated Jan. 30, 2024, 6 pages.
European Official Action issued in related Application No. 21792462.0, dated Feb. 15, 2024, 7 pages.
European Official Action issued in related Application No. 20785209.6, dated Mar. 15, 2024, 6 pages.
European Official Action issued in related Application No. 20868996.8, dated Oct. 2, 2023, 8 pages.
Korean Official Action issued in related Application No. 10-2021-7034329, dated Jan. 2, 2024 with translation, 12 pages.
Official Action issued in related U.S. Appl. No. 17/603,291, dated Feb. 20, 2024, 10 pages.
Official Action issued in related U.S. Appl. No. 17/255,085, dated Mar. 28, 2024, 8 pages.
Official Action issued in related U.S. Appl. No. 17/600,529, dated Jan. 24, 2024, 15 pages.
Official Action issued in related U.S. Appl. No. 17/919,731, dated Nov. 9, 2023, 7 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a CS valve provided between a control port through which a control fluid of the control pressure Pc passes and a suction port through which a suction fluid of the suction pressure Ps passes is opened and closed to adjust the control pressure Pc of the control chamber of the variable displacement compressor.

For example, a capacity control valve shown in Patent Citation 1 mainly includes a valve housing that includes a Pc port through which a control fluid passes and a Ps port through which a suction fluid passes and a CS valve that is able to switch a communication state of the Pc port and the Ps port and adjusts a control pressure Pc by opening and closing the CS valve. The CS valve includes a CS valve element that is axially driven by a solenoid and a CS valve seat that is provided between the Pc port and the Ps port and is able to contact the CS valve element and is configured to increase the control pressure Pc by closing the CS valve and decrease the control pressure Pc by opening the CS valve.

CITATION LIST

Patent Literature

Patent Citation 1: JP 3581598 B2 (PAGE 4, FIG. 8)

SUMMARY OF INVENTION

Technical Problem

However, in the capacity control valve of Patent Citation 1, since the Pc port is disposed in the solenoid driving direction and the control pressure Pc flowing from the Pc port at the time of driving the solenoid is applied as a drag force of the CS valve element, there is a possibility that the responsiveness of the CS valve element decreases.

The present invention is achieved focusing on such a problem, and an object thereof is to provide a capacity control valve capable of immediately operating a CS valve element.

Solution to Problem

In order to solve the foregoing problem, a capacity control valve according to the present invention is a capacity control valve includes: a valve housing that is provided with a suction port through which a suction fluid of a suction pressure passes and a control port through which a control fluid of a control pressure passes; a CS valve that includes a CS valve element which is axially driven by a solenoid and a CS valve seat which is provided between the suction port and the control port and is brought into contact with and separated from the CS valve element; and biasing member configured to bias the CS valve element in a valve closing direction of the CS valve, wherein a space is formed inside the valve housing in opposition to the solenoid through the CS valve element and the suction fluid flows into the space. According to the aforesaid feature of the present invention, since the suction fluid having a pressure lower than that of the control fluid flows into the space on the side opposite to the solenoid which is on the solenoid driving direction side in relation to the CS valve element, a drag force applied to the CS valve element at the time of driving the solenoid can be decreased and the CS valve element can be immediately operated.

It may be preferable that the biasing member is disposed in the space. According to this preferable configuration, since the biasing member can be disposed by using the space into which the suction fluid flows, the capacity control valve can be configured with a compact size.

It may be preferable that a communication passage for communication between the space and the suction port is provided. According to this preferable configuration, the control fluid can be caused to flow from the suction port formed in the valve housing into the space through the communication passage.

It may be preferable that the communication passage is formed in the CS valve element. According to this preferable configuration, since the communication passage is formed in the CS valve element, the processing is simple compared to a case in which the communication passage is formed in the valve housing.

It may be preferable that the space and the control port are partitioned. According to this preferable configuration, the suction fluid can be easily maintained in the space.

It may be preferable that the space and the control port are partitioned by a bellows. According to this preferable configuration, the space and the control port can be partitioned by a simple configuration.

It may be preferable that the space and the control port are partitioned by the CS valve element and the valve housing is provided with a guide hole having an inner periphery which slides on an outer periphery of the CS valve element to guide the CS valve element. According to this preferable configuration, the space and the control port can be partitioned in a sealed state by the CS valve element even when a member for partitioning the space and the control port is not separately provided.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 3. Hereinafter, description will be given with the left and right sides seen from the front side of FIG. 1 being the left and right sides of the capacity control valve.

A capacity control valve V according to the first embodiment of the present invention is assembled into a variable displacement compressor (not shown) used for an air conditioning system of an automobile, etc. By variably controlling pressure of a working fluid (hereinafter, simply referred to as the "fluid") serving as a coolant, a discharge amount of the variable displacement compressor is controlled and the air conditioning system is adjusted to have a desired cooling ability.

First, the variable displacement compressor will be described. The variable displacement compressor has a casing including a discharge chamber, a suction chamber, a control chamber, and plural cylinders. A communication passage providing direct communication between the discharge chamber and the control chamber is provided in the variable displacement compressor and a fixed orifice 9 for adjusting and balancing pressure between the discharge chamber and the control chamber is provided in this communication passage (see FIGS. 1 to 3).

The variable displacement compressor also includes a rotating shaft to be driven and rotated by an engine (not shown) installed outside the casing, a swash plate coupled to the rotating shaft in an eccentric state by a hinge mechanism in the control chamber, and plural pistons coupled to the swash plate and fitted reciprocatably in the respective cylinders. With using the capacity control valve V to be driven to open and close by electromagnetic force, a tilt angle of the swash plate is continuously changed by appropriately controlling pressure in the control chamber while utilizing suction pressure Ps of the suction chamber that suctions the fluid, discharge pressure Pd of the discharge chamber that discharges the fluid pressurized by the pistons, and control pressure Pc of the control chamber that houses the swash plate. Thereby, a stroke amount of the pistons is changed to control a discharge amount of the fluid.

Figure 1:
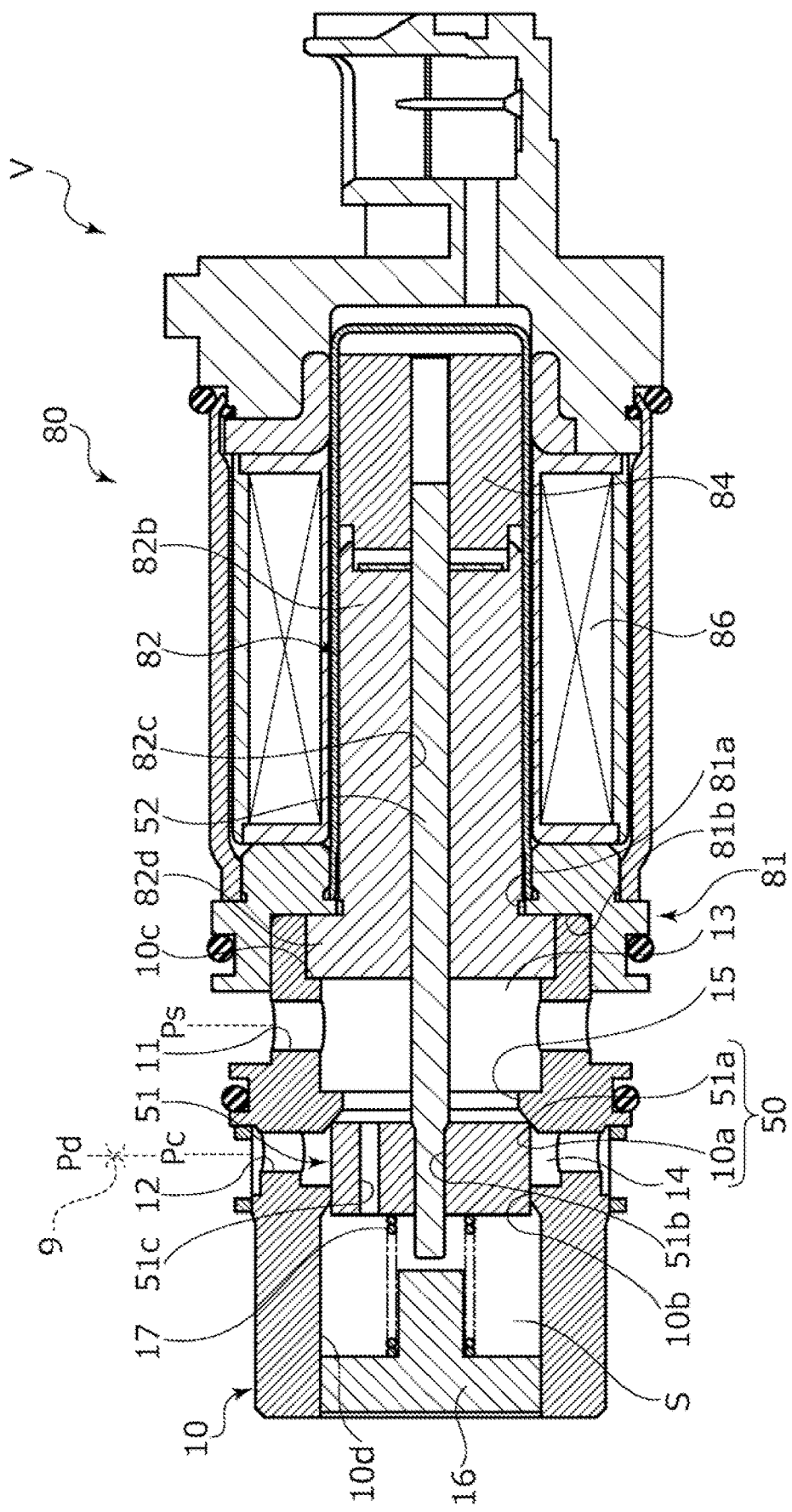
FIG. 1 is a sectional view showing a structure of a capacity control valve according to a first embodiment of the present invention.

As shown in FIG. 1, the capacity control valve V assembled into the variable displacement compressor adjusts an electric current energized in a coil 86 forming a solenoid 80 and performs open/close control of a CS valve 50 in the capacity control valve V so that the fluid flowing out to the suction chamber from the control chamber is controlled and the control pressure Pc in the control chamber is variably controlled. A discharge fluid of the discharge pressure Pd of the discharge chamber is always supplied to the control chamber via the fixed orifice 9, and the control pressure Pc in the control chamber can be increased by closing the CS valve 50 in the capacity control valve V.

In the present embodiment, the CS valve 50 includes a CS valve element 51 which is a valve element and a CS valve seat 10a which is formed on an inner peripheral surface of the valve housing 10 and an axially right end 51a of the CS valve element 51 moves to be in contact with and separated from the CS valve seat 10a so that the CS valve 50 is opened and closed.

Next, a structure of the capacity control valve V will be described. As shown in FIG. 1, the capacity control valve V mainly includes a valve housing 10 which is formed of a metal material or a resin material, a CS valve element 51 of which an axially left end portion is disposed inside the valve housing 10, and a solenoid 80 which is connected to the valve housing 10 and applies drive force to the CS valve element 51.

Figure 2:
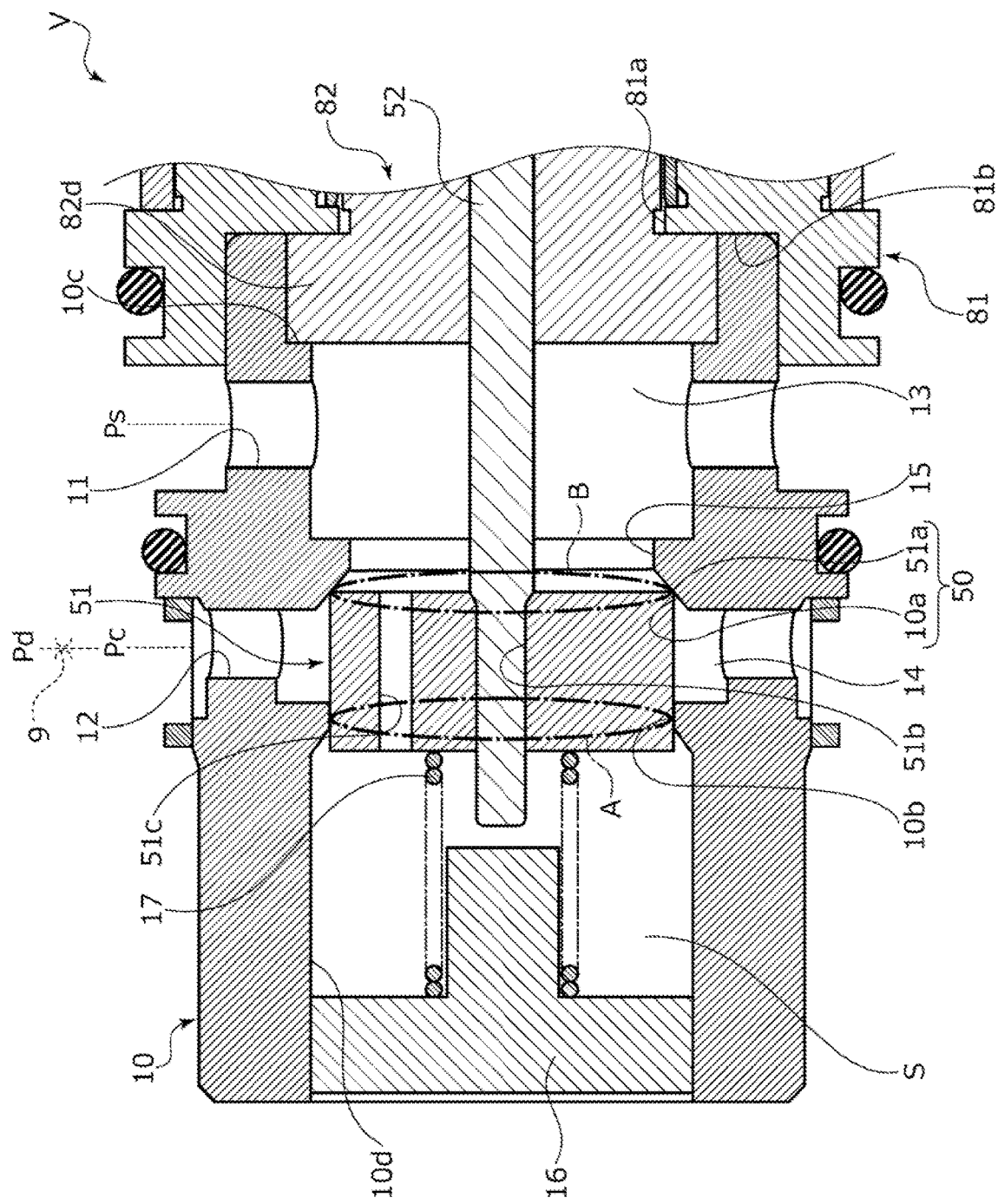
FIG. 2 is a sectional view showing a closed state of a CS valve in a non-energized state of the capacity control valve according to the first embodiment of the present invention.
Figure 3:
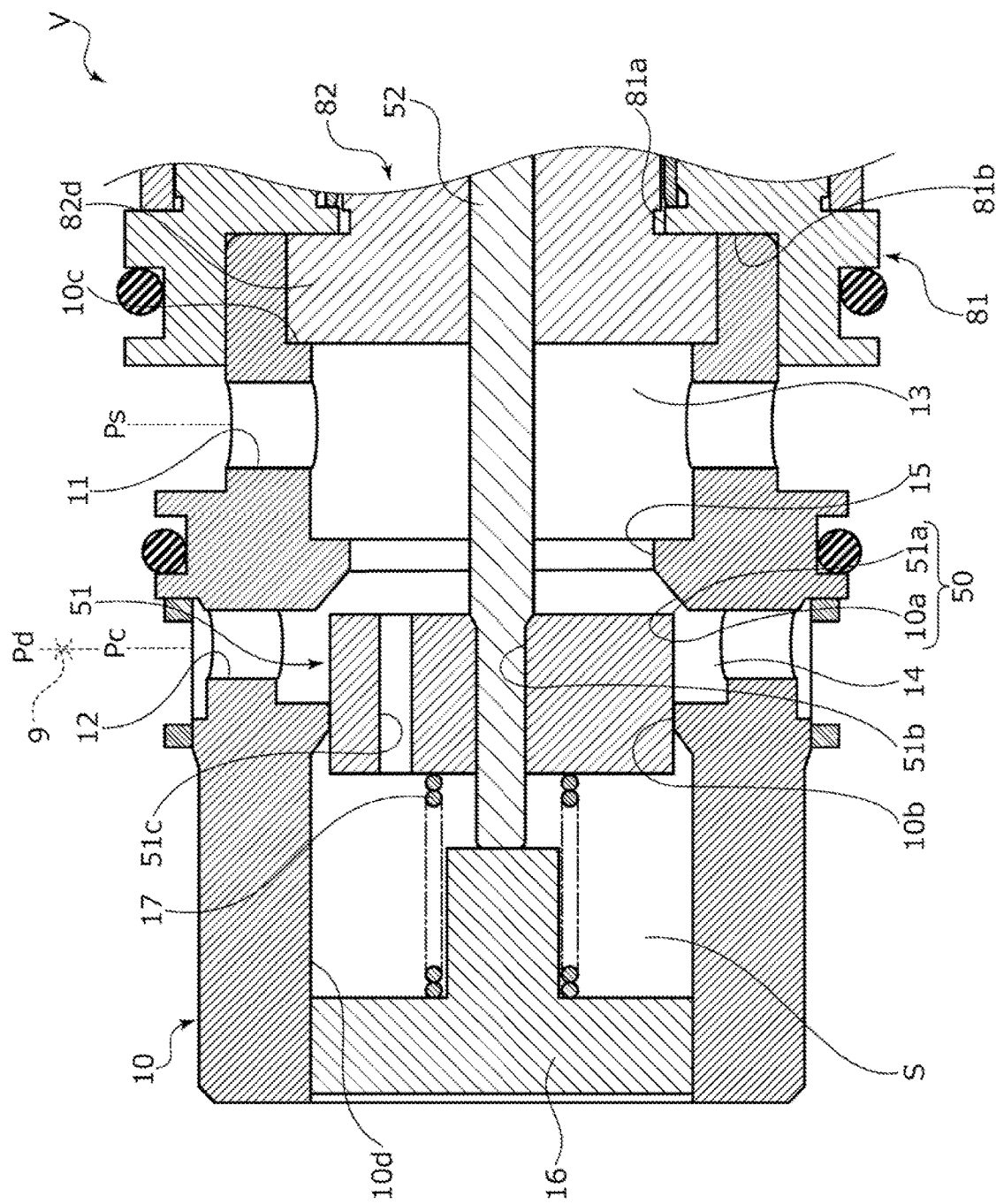
FIG. 3 is a sectional view showing an open state of the CS valve in an energized state of the capacity control valve according to the first embodiment of the present invention.

As shown in FIGS. 1 to 3, the CS valve element 51 is a cylindrical body which has a through hole 51b formed at the center portion to penetrate in the axial direction and an axially left end portion of a rod 52 disposed to penetrate the coil 86 of the solenoid 80 is press-inserted and fixed to the through hole 51b. Further, in the CS valve element 51, a communication passage 51c which penetrates in the axial direction is formed at a position shifted from the through hole 51b in the radial direction. In addition, the communication passage 51c may be provided at a plurality of positions and this is preferable in that the suction fluid can easily flow in and out.

As shown in FIGS. 1 and 2, the valve housing 10 is provided with a Ps port 11 which is a suction port communicating with the suction chamber of the variable displacement compressor and a Pc port 12 which is a control port communicating with the control chamber of the variable displacement compressor. The Ps port 11 is formed on the axially right side in relation to the Pc port 12, specifically, the CS valve seat 10a.

A suction fluid supply chamber 13 to which the suction fluid is supplied from the Ps port 11, a control fluid supply chamber 14 to which the control fluid is supplied from the Pc port 12, a valve opening portion 15 which is disposed between the suction fluid supply chamber 13 and the control fluid supply chamber 14 and in which the CS valve seat 10a is formed at the axially left edge portion, a recessed portion 10d which opens to the axially left side and is disposed on the axially left side in relation to the control fluid supply chamber 14, and a guide hole 10b which is provided in the bottom of the recessed portion 10d, that is, the axially right end of the recessed portion 10d and is slidable on the outer peripheral surface of the CS valve element 51 in a substantially sealed state are provided inside the valve housing 10.

An opening portion of the axially left end of the recessed portion 10*d* is closed by the lid member 16 and a space S defined by the recessed portion 10*d*, the lid member 16, and the CS valve element 51 is formed inside the valve housing 10. In addition, the inner peripheral surface of the guide hole 10*b* and the outer peripheral surface of the CS valve element 51 are slightly separated from each other in the radial direction so that a minute gap is formed therebetween, the CS valve element 51 is smoothly relatively movable in the axial direction with respect to the valve housing 10, and the gap functions as a clearance seal that substantially seals the space S and the control fluid supply chamber 14.

The suction fluid supply chamber 13 and the space S communicate with each other by the communication passage 51*c* formed in the CS valve element 51. That is, the suction fluid supplied into the suction fluid supply chamber 13 flows into the space S through the communication passage 51*c*. Further, a spring 17 which is bias means biasing the CS valve element 51 rightward in the axial direction is disposed in the space S.

In the valve housing 10, a recessed portion 10*c* of which an inner radial side of an axially right end is recessed leftward in the axial direction is formed and a flange portion 82*d* of the center post 82 is inserted and fitted from the axially right side so as to be integrally connected and fixed in a substantially sealed state. In addition, an opening end on the side of the solenoid 80 of the suction fluid supply chamber 13 is formed on the inner radial side of the bottom surface of the recessed portion 10*c* of the valve housing 10.

As shown in FIG. 1, the solenoid 80 mainly includes a casing 81 which has an opening portion 81*a* opening to the axially left side, a substantially cylindrical center post 82 which is inserted into the opening portion 81*a* of the casing 81 from the axially left side and is fixed to the inner radial side of the casing 81, the rod 52 which is inserted through the center post 82, is axially and reciprocatably movable, and is disposed so that an axially left end portion is located on the axially left side in relation to the CS valve seat 10*a*, the CS valve element 51 which is press-inserted and fixed to the axially left end portion of the rod 52, a movable iron core 84 into which the axially right end portion of the rod 52 is inserted and fixed, and the excitation coil 86 which is wound on the outside of the center post 82 through a bobbin.

The casing 81 is provided with a recessed portion 81*b* which is formed by recessing the inner radial side of the axially left end rightward in the axial direction and the axially right end portion of the valve housing 10 is inserted and fixed to the recessed portion 81*b* in a substantially sealed state.

The center post 82 is formed from a rigid body that is a magnetic material such as iron or silicon steel and includes a cylindrical portion 82*b* that extends in the axial direction and is provided with an insertion hole 82*c* into which the rod 52 is inserted and an annular flange portion 82*d* that extends radially outward from the outer peripheral surface of the axially left end portion of the cylindrical portion 82*b*.

Further, the center post 82 is inserted and fixed to the recessed portion 10*c* of the valve housing 10 inserted and fixed to the recessed portion 81*b* of the casing 81 in a substantially sealed state while the axially right end surface of the flange portion 82*d* comes into contact with the bottom surface of the recessed portion 81*b* of the casing 81 from the axially left side. That is, the center post 82 is fixed by sandwiching the flange portion 82*d* between the bottom surface of the recessed portion 81*b* of the casing 81 and the bottom surface of the recessed portion 10*c* of the valve housing 10 from both sides in the axial direction.

Next, actions of the capacity control valve V, mainly actions of opening and closing the CS valve 50 will be described.

First, a non-energized state of the capacity control valve V will be described. As shown in FIGS. 1 and 2, in a non-energized state of the capacity control valve V, the CS valve element 51 is pressed to the axially right side by the bias force of the spring 17 so that the axially right end 51*a* of the CS valve element 51 is seated on the CS valve seat 10*a* to close the CS valve 50. Specifically, the edge portion of the axially right end 51*a* of the CS valve element 51 is seated on the CS valve seat 10*a* formed in a tapered shape to be enlarged toward the axially left side.

At this time, to the CS valve element 51, the bias force $F_{sp}$ of the spring 17 and force $F_{P1}$ by pressure of the fluid to an axially left end surface of the CS valve element 51 are applied to the axially right side and force $F_{P2}$ by pressure of the fluid to the axially right end surface of the CS valve element 51 is applied to the axially left side. That is, given that the right side is the positive side, force $F_{rod}=F_{sp}+F_{P1}-F_{P2}$ is applied to the CS valve element 51.

Specifically, a fluid inside the space S is applied to the axially left end surface of the CS valve element 51 and a fluid inside the suction fluid supply chamber 13 is applied to the axially right end surface of the CS valve element 51. Since the suction fluid supply chamber 13 and the space S communicate with each other by the communication passage 51*c* formed in the CS valve element 51, the suction fluid supplied from the Ps port 11 flows to the space S and the suction fluid supply chamber 13. Further, the axially left end surface of the CS valve element 51 is formed to have the same diameter as that of the axially right end surface. In other words, an effective pressure receiving area A of the CS valve element 51 where the fluid of the space S is applied is the same as an effective pressure receiving area B of the CS valve element 51 where the fluid inside the suction fluid supply chamber 13 is applied (i.e., A=B).

In this way, since the fluid flowing into the space S and the suction fluid supply chamber 13 is the same as the suction fluid supplied from the Pc port 12 and the effective pressure receiving areas A and B of the CS valve element 51 are the same, the force $F_{P1}$ by the pressure of the fluid to the axially left end surface of the CS valve element 51 and the force $F_{P2}$ to the axially right end surface of the CS valve element 51 are the same (i.e., $F_{P1}=F_{P2}$) and the force $F_{P1}$ by the pressure of the fluid and the force $F_{P2}$ by the pressure of the fluid are canceled. That is, given that the right side is the positive side, the force $F_{rod}=F_{sp}$ is substantially applied to the CS valve element 51.

Next, an energized state of the capacity control valve V will be described. As shown in FIGS. 1 and 3, in the capacity control valve V, in an energized state, that is, at the time of normal control or so-called duty control, when electromagnetic force $F_{sol}$ generated by applying an electric current to the solenoid 80 exceeds the force $F_{rod}$ (i.e., $F_{sol}>F_{rod}$), the movable iron core 84 is pulled toward the axially left side, that is, toward the center post 82 and both the CS valve element 51 and the rod 52 fixed to the movable iron core 84 are moved toward the axially left side so that the axially right end 51*a* of the CS valve element 51 is separated from the CS valve seat 10*a* of the valve housing 10 to open the CS valve 50. Further, the movable iron core 84 contacts the axially right side of the center post 82 at the time of driving the solenoid 80, the further separation of the CS valve element 51 from the CS valve seat 10*a* is regulated. In addition, the axially left end of the rod 52 may contact the shaft portion protruding rightward from the lid member 16 to regulate the movement of the CS valve element 51.

At this time, to the CS valve element 51, the electromagnetic force $F_{sol}$ is applied on the axially left side, and the force $F_{rod}$ is applied on the axially right side. That is, given that the right side is the positive side, force $F_{rod}$-$F_{sol}$ is applied to the CS valve element 51.

In this way, the capacity control valve V performs Pc-Ps control by opening and closing the CS valve 50 so that the control fluid of the control pressure Pc supplied from the Pc port 12 is supplied to the suction chamber through the Ps port 11 to decrease the control pressure Pc of the control chamber. In other words, the discharge fluid of the discharge pressure Pd having a high pressure is not directly controlled. Therefore, it is possible to finely change the control pressure Pc in accordance with the valve opening degree of the CS valve 50 adjusted by the balance of the electromagnetic force of the solenoid 80 and the bias force of the spring 17.

As described above, since the space S is formed on the driving direction side of the solenoid 80 in relation to the CS valve element 51, that is, the operation direction side of the CS valve element 51 and the suction fluid having a pressure lower than that of the control fluid flows into this space S, it is possible to decrease a drag force applied to the CS valve element 51 when the CS valve 50 is switched from the closed state to the open state and to immediately operate the CS valve element 51. In particular, since the capacity control valve V is formed in a normally closed type in which the CS valve element 51 is biased by the spring 17 in the valve closing direction of the CS valve 50, it is possible to promptly decrease the control pressure Pc by immediately operating the CS valve element 51 to open the CS valve 50.

Further, since the spring 17 is disposed in the space S into which the suction fluid flows, it is not necessary to ensure a space for disposing the spring 17 on the side of the solenoid 80 and it is possible to configure the capacity control valve V in a compact size. Further, since the spring 17 is disposed on the side opposite to the solenoid 80 in the CS valve element 51, it is possible to stably operate the CS valve element 51.

Further, the communication passage 51c is formed for communication between the space S and the Ps port 11 and the control fluid can flow from the Ps port 11 formed in the valve housing 10 to the space S through the communication passage 51c. Accordingly, it is not necessary to form, for example, a suction port in the valve housing 10 or the lid member 16 separately from the Ps port 11 and it is possible to simplify the structure of the capacity control valve V.

Further, since the communication passage 51c is formed to penetrate the CS valve element 51 in the axial direction, it is easy to process the communication passage for communication between the space S and the Ps port 11 compared to a case in which the communication passage is formed in the valve housing 10.

Further, since the space S and the Pc port 12 are partitioned by the CS valve element 51, the valve housing 10 is provided with the guide hole 10b which guides the movement of the CS valve element 51, and the space S and the Pc port 12 are partitioned in a substantially sealed state by the clearance seal formed between the inner peripheral surface of the guide hole 10b and the outer peripheral surface of the CS valve element 51, it is possible to suppress the control fluid from flowing into the space S in the closed state of the CS valve 50. In other words, since it is easy to hold the suction fluid inside the space S, it is possible to reliably decrease a drag force applied to the CS valve element 51 when the CS valve 50 is switched from the closed state to the open state. Further, since the space S and the Pc port 12 are partitioned in a substantially sealed state by the clearance seal formed between the inner peripheral surface of the guide hole 10b and the outer peripheral surface of the CS valve element 51, it is not necessary to separately provide a member for partitioning the space S and the Pc port 12 and it is possible to decrease the number of parts and to simplify the structure of the capacity control valve V.

Further, since the valve housing 10 is provided with the guide hole 10b through which the CS valve element 51 is inserted, it is possible to increase the accuracy of the operation of the CS valve element 51 by guiding the CS valve element 51 to the guide hole 10b. Further, since the CS valve seat 10a and the guide hole 10b are integrally formed with each other in the valve housing 10, it is possible to provide a compact capacity control valve V with a small number of parts.

Additionally, in the first embodiment, a case has been described in which the effective pressure receiving area A of the CS valve element 51 where the fluid of the space S is applied is the same as the effective pressure receiving area B of the CS valve element 51 where the fluid inside the suction fluid supply chamber 13 is applied. However, the effective pressure receiving area A may be slightly larger than the effective pressure receiving area B (i.e., A>B) so that the CS valve 50 is reliably maintained in the closed state and the effective pressure receiving area A may be slightly smaller than the effective pressure receiving area B (i.e., A<B) so that the CS valve 50 is easily maintained in the open state.

Second Embodiment

A capacity control valve according to a second embodiment of the present invention will be described with reference to FIGS. 4 to 6. Duplicated description for the same configurations as the first embodiment is omitted.

Figure 4:
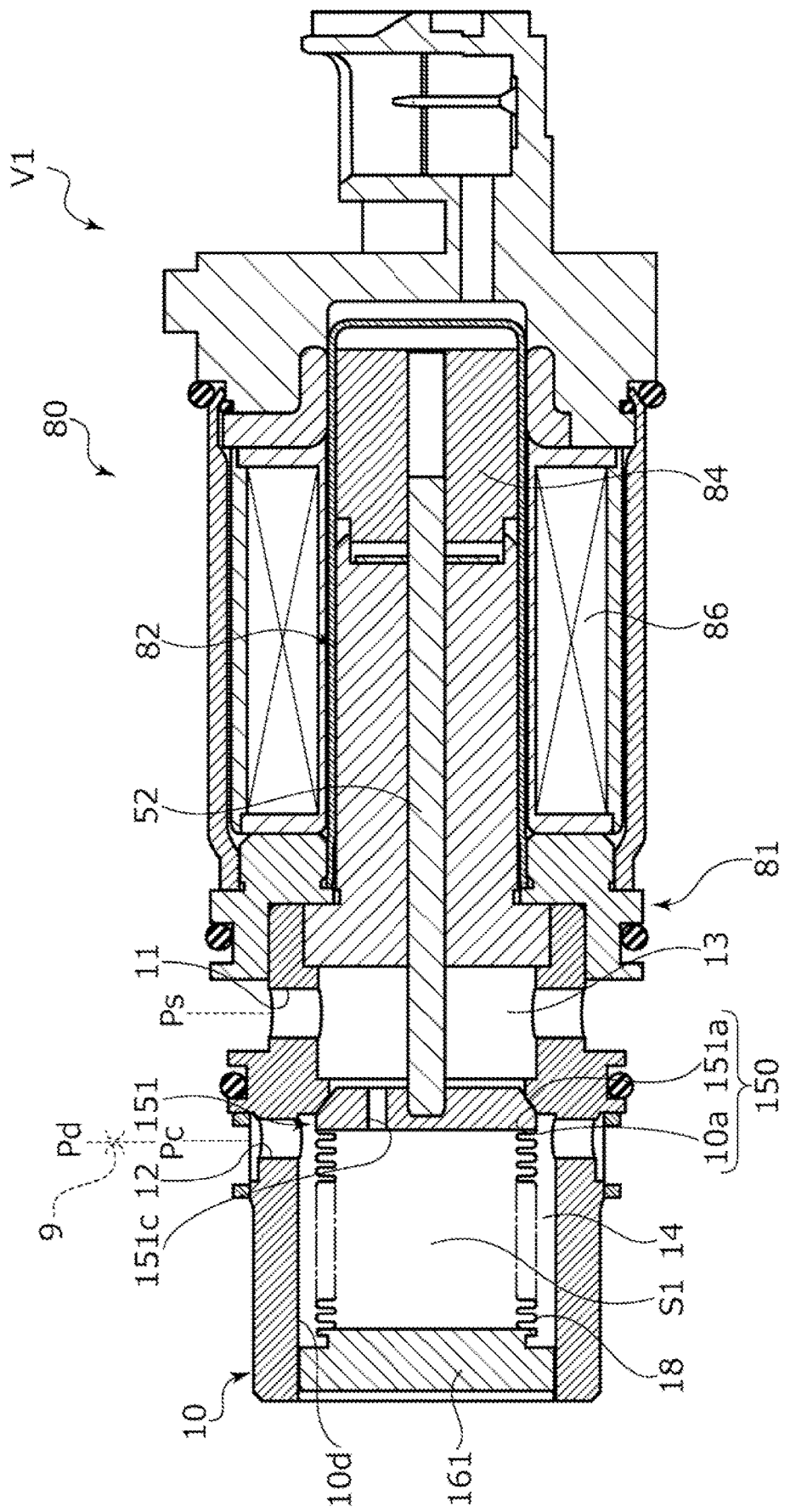
FIG. 4 is a sectional view showing a structure of a capacity control valve according to a second embodiment of the present invention.
Figure 5:
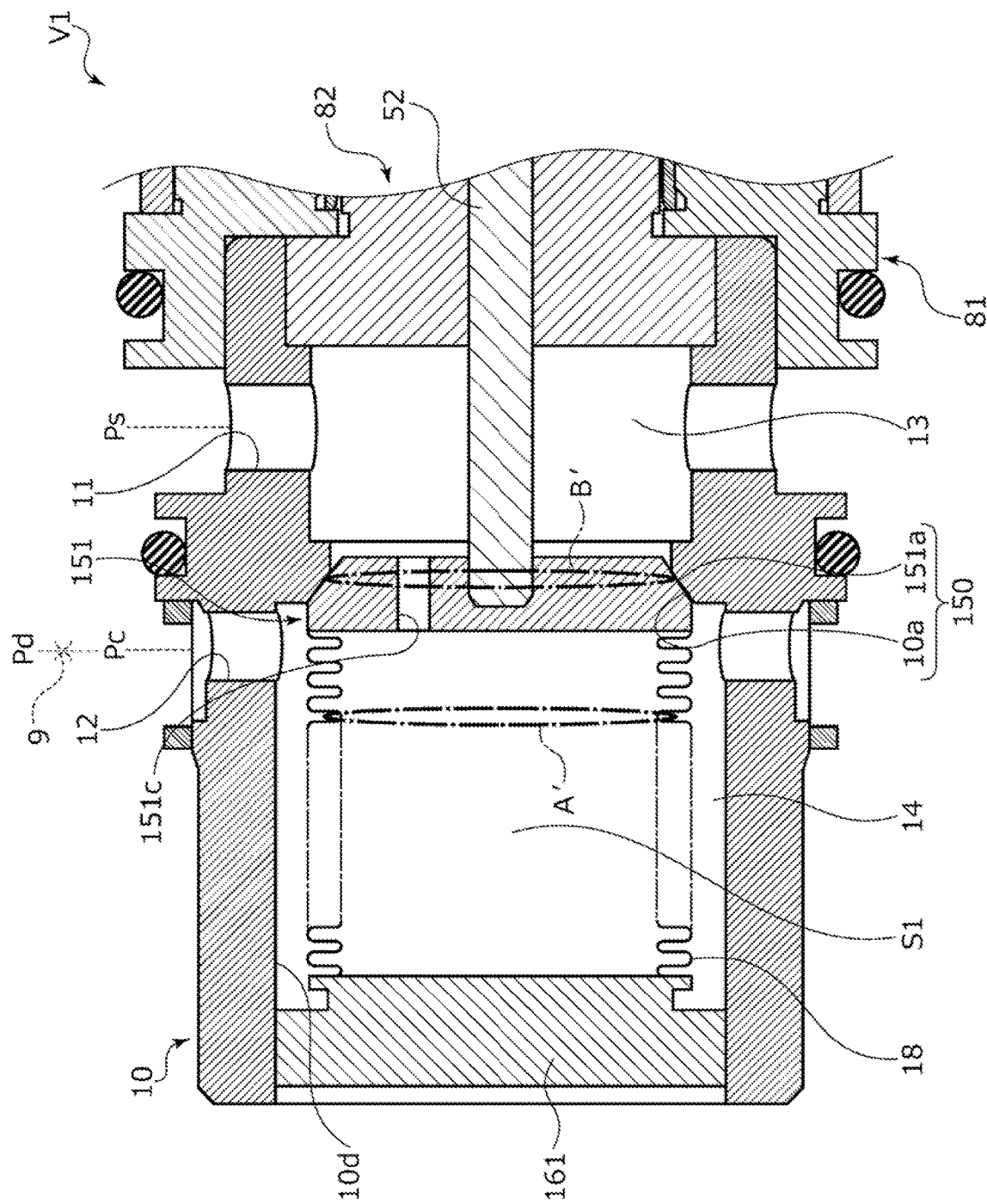
FIG. 5 is a sectional view showing a closed state of a CS valve in a non-energized state of the capacity control valve according to the second embodiment of the present invention.
Figure 6:
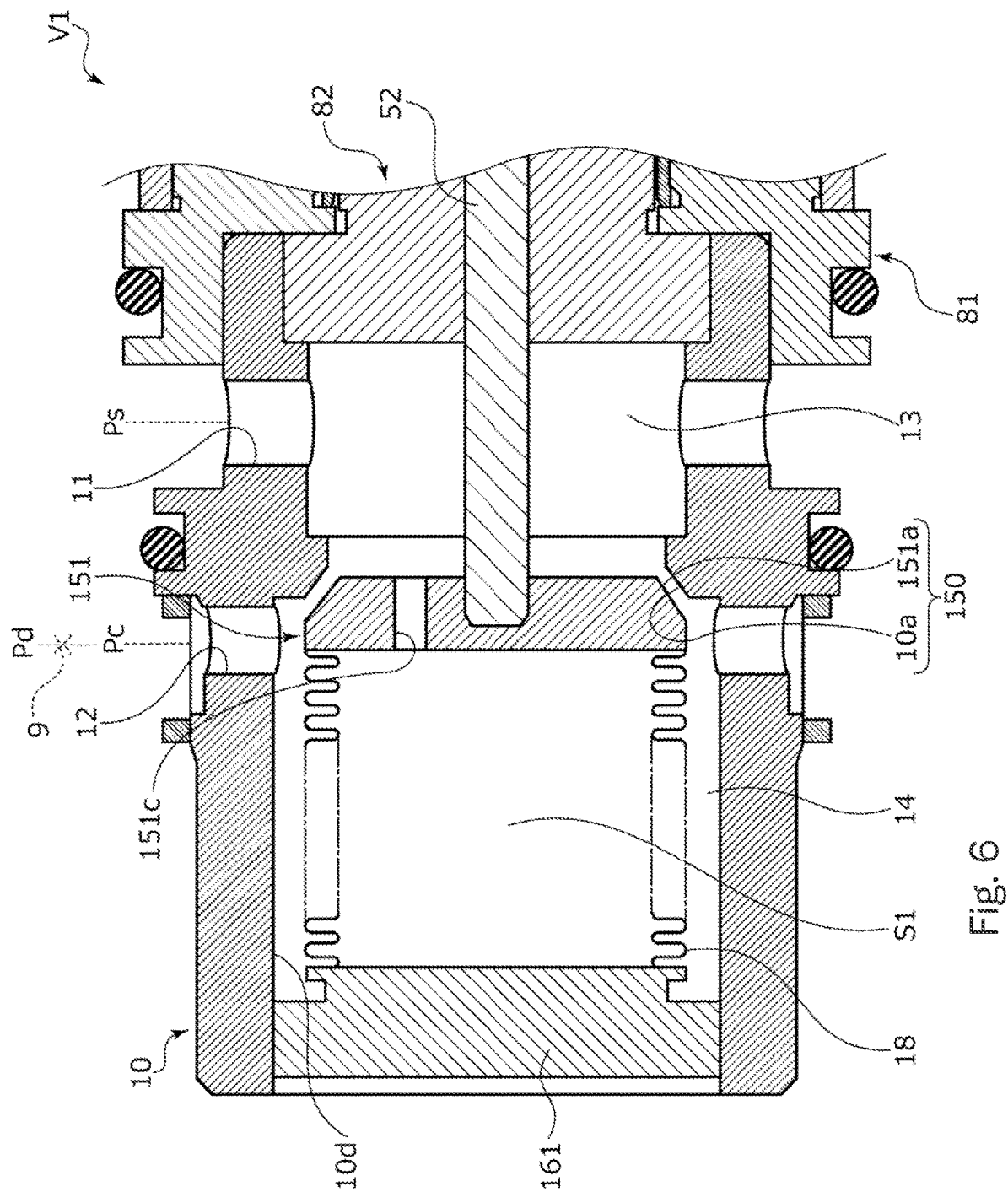
FIG. 6 is a sectional view showing an open state of the CS valve in an energized state of the capacity control valve according to the second embodiment of the present invention.

As shown in FIGS. 4 and 5, in the second embodiment, the CS valve element 151 of the CS valve 150 is formed in a tapered shape so that an axially right end 151a is tapered to the axially right side and is seated on the CS valve seat 10a in a wide surface in the closed state of the CS valve 150. Further, a communication passage 151c is formed in the CS valve element 151 to penetrate in the axial direction. Further, the axially right end surface of the CS valve element 151 is slightly smaller than the axially left end surface of the CS valve element 151.

The control fluid supply chamber 14 of the second embodiment communicates with the recessed portion 10d and a bellows 18 which is bias means for biasing the CS valve element 151 to the axially right side, that is, in the valve closing direction of the CS valve 150 is disposed in the control fluid supply chamber 14 instead of the spring 17. In the bellows 18, the axially left end is fixed to a lid member 161 closing the recessed portion 10d in a substantially sealed state and the axially right end is fixed to the axially left end surface of the CS valve element 151 in a substantially sealed state so that a space S1 is formed therein. Further, the suction fluid supply chamber 13 communicates with the space S1 through the communication passage 151c and the suction fluid inside the suction fluid supply chamber 13 flows into the space S1. That is, the bellows 18 partitions the space S1 and the control fluid supply chamber 14 in a sealed state when the CS valve 150 is in the closed state. In addition, a spring for axial biasing may be assembled to the bellows 18. That is, an effective pressure receiving area A' of the bellows 18 is formed to be slightly larger than an effective pressure receiving area B' on the axially right side of the CS valve element 151 (i.e., A'>B').

Next, actions of the capacity control valve V1, mainly actions of opening and closing the CS valve 150 will be described.

First, a non-energized state of the capacity control valve V1 will be described. As shown in FIGS. 4 and 5, in a non-energized state of the capacity control valve V, the CS valve element 151 is pressed to the axially right side by the bias force of the bellows 18 so that the axially right end 151a of the CS valve element 151 is seated on the CS valve seat 10a to close the CS valve 150.

At this time, to the CS valve element 151, the bias force $F_{bel}$ of the bellows 18 and force $F_{P1}$ by pressure of the fluid to the axially left end surface of the CS valve element 151 are applied to the axially right side and force $F_{P2}$ by pressure of the fluid to the axially right surface of the CS valve element 151 is applied to the axially left side. That is, given that the right side is the positive side, force $F_{rod}=F_{sp}+F_{P1}-F_{P2}$ is applied to the CS valve element 151.

Specifically, since the effective pressure receiving area A' on the axially left side of the CS valve element 151 is slightly larger than the effective pressure receiving area B' on the axially right side, the force $F_{P1}$ by the pressure of the fluid to the axially left end surface of the CS valve element 151 is slightly larger than the force $F_{P2}$ by the pressure of the fluid to the axially right surface of the CS valve element 151 (i.e., $F_{P1}$>$F_{P2}$). Accordingly, it is easy to maintain the closed state of the CS valve 150 even when a slight pressure difference is immediately generated between the pressure inside the space S1 and the pressure inside the suction fluid supply chamber 13.

Next, an energized state of the capacity control valve V1 will be described. As shown in FIGS. 4 and 6, in the capacity control valve V1, in an energized state, that is, at the time of normal control or so-called duty control, when electromagnetic force $F_{sol}$ generated by applying an electric current to the solenoid 80 exceeds the force $F_{rod}$ (i.e., $F_{sol}$>$F_{rod}$), the movable iron core 84 is pulled toward the axially left side, that is, toward the center post 82 and both the CS valve element 151 and the rod 52 fixed to the movable iron core 84 are moved toward the axially left side so that the axially right end 151a of the CS valve element 151 is separated from the CS valve seat 10a of the valve housing 10 to open the CS valve 150.

In this way, since the suction fluid flows into the space S1 formed on the operation direction side of the CS valve element 151, it is possible to immediately operate the CS valve element 151 by decreasing a drag force applied to the CS valve element 151 when the CS valve 150 is switched from the closed state to the open state.

Further, since the space S1 and the Pc port 12 are partitioned in a substantially sealed state by the bellows 18, it is possible to prevent the control fluid from flowing into the space S1 in the closed state of the CS valve 150. In other words, since it is possible to hold the suction fluid inside the space S1 in the closed state of the CS valve 150, it is possible to reliably decrease a drag force applied to the CS valve element 151 when the CS valve 150 is switched from the closed state to the open state. Further, since the bellows 18 partitioning the space S1 and the Pc port 12 also serves as bias means, the capacity control valve V1 can have a simple configuration.

Additionally, in the second embodiment, a case has been described in which the bellows 18 has a function of partitioning the space S1 and the Pc port 12 and a function of the bias means, but if the bias means biasing the CS valve element 151 in the valve closing direction is separately provided, the bellows 18 may not have the bias force.

Third Embodiment

A capacity control valve according to a third embodiment of the present invention will be described with reference to FIGS. 7 to 9. Duplicated description for the same configurations as the first embodiment is omitted.

Figure 7:
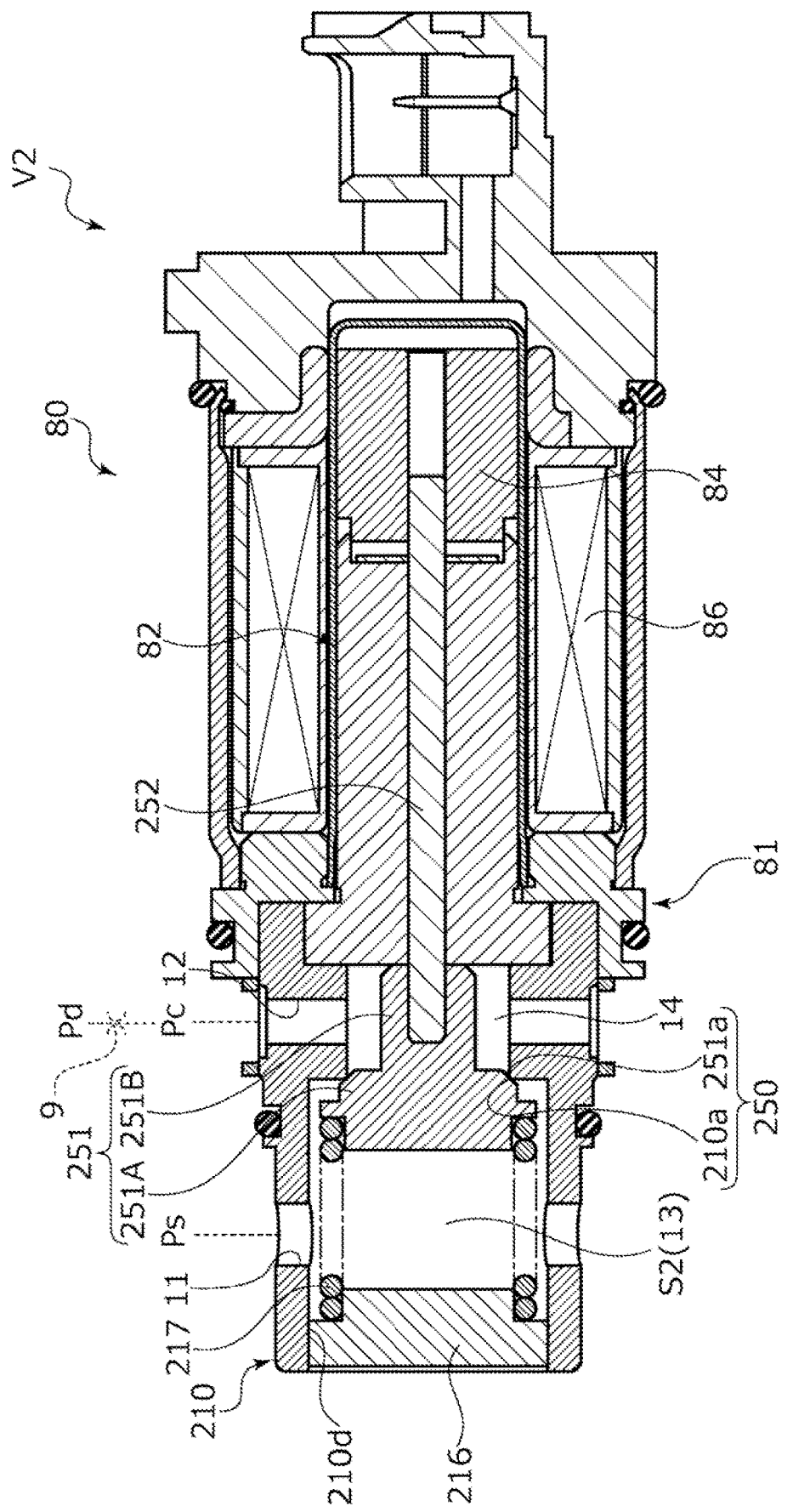
FIG. 7 is a sectional view showing a structure of a capacity control valve according to a third embodiment of the present invention.
Figure 8:
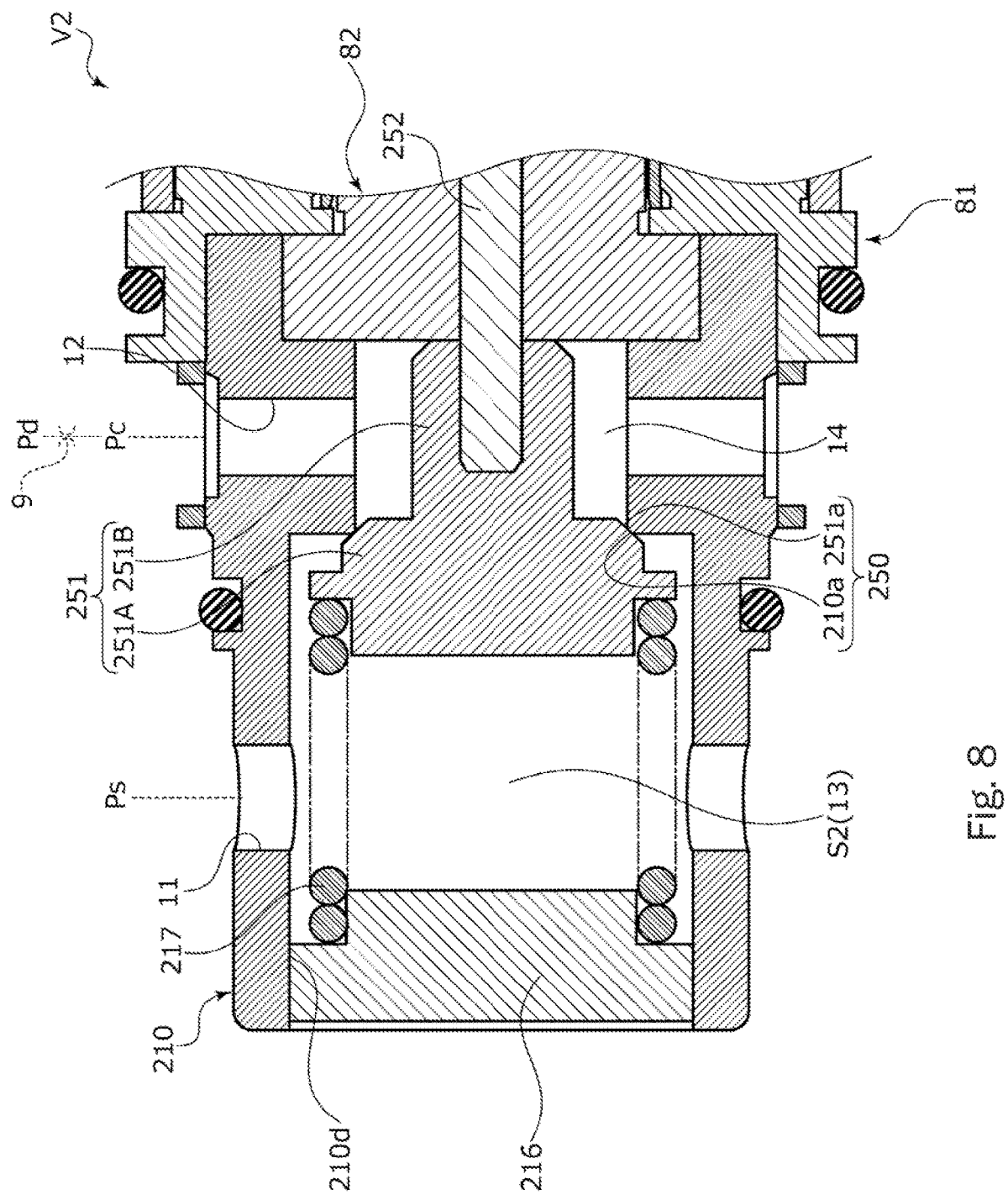
FIG. 8 is a sectional view showing a closed state of a CS valve in a non-energized state of the capacity control valve according to the third embodiment of the present invention.
Figure 9:
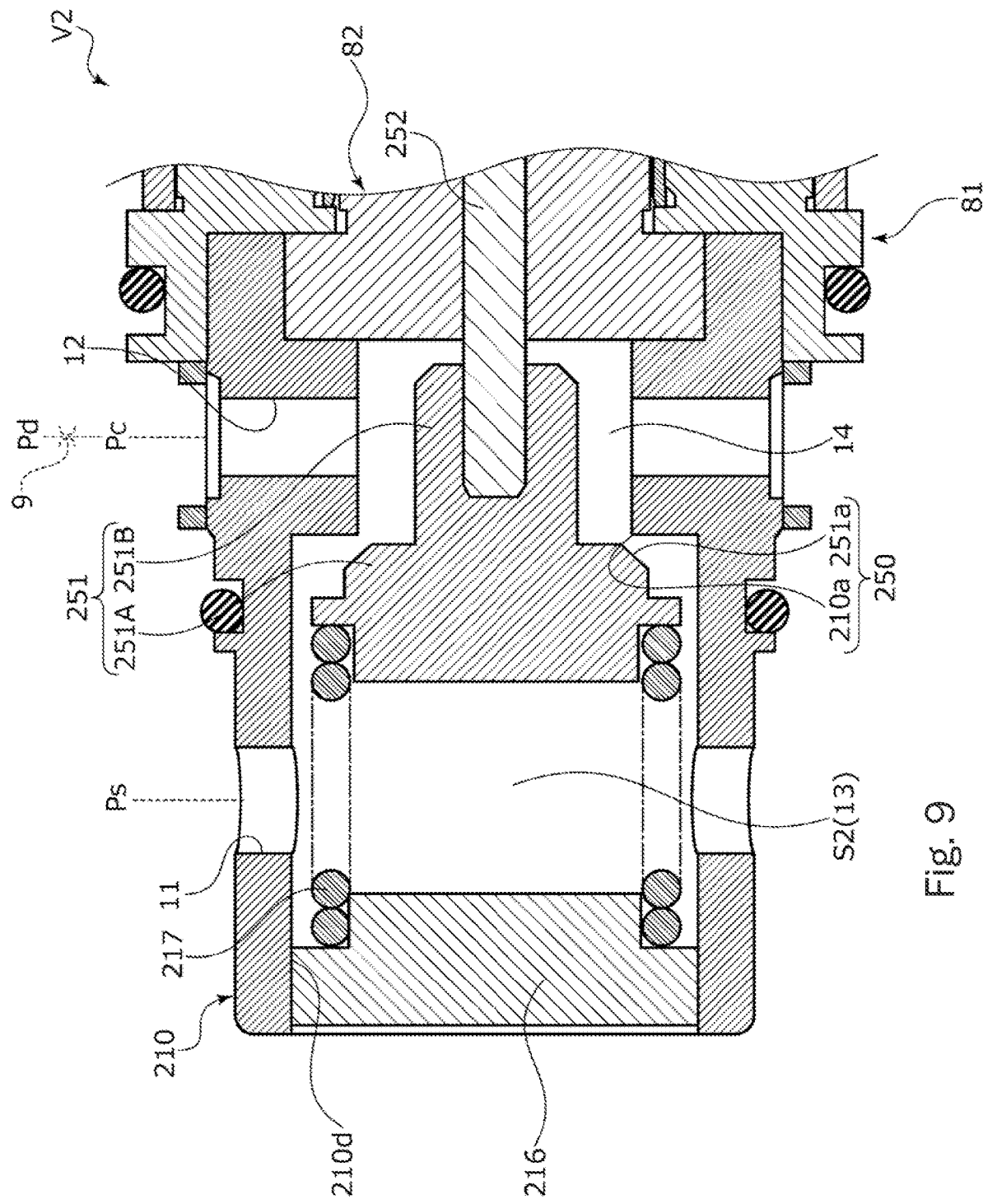
FIG. 9 is a sectional view showing an open state of the CS valve in an energized state of the capacity control valve according to the third embodiment of the present invention.

As shown in FIGS. 7 and 8, a CS valve element 251 includes a large diameter portion 251A which is movable to be in contact with and separated from the CS valve seat 210a of the valve housing 210 and a cylindrical small diameter portion 251B which protrudes toward the axially right side from the center of the large diameter portion 251A and an axially left end of a rod 252 is press-inserted and fixed to the small diameter portion 251B.

Further, in the valve housing 210 of the third embodiment, the Ps port 11 is formed on the axially left side in relation to the CS valve seat 210a and the Pc port 12 is formed on the axially right side in relation to the CS valve seat 210a. Further, a space S2 which is partitioned by a recessed portion 210d, a lid member 216, and the CS valve element 251 is formed on the axially left side, that is, the operation direction side of the CS valve element 251 in relation to the CS valve seat 210a of the valve housing 210 and the space S2 functions as the suction fluid supply chamber 13. Further, in the valve housing 210, the CS valve seat 210a is formed between the control fluid supply chamber 14 and the suction fluid supply chamber 13. Further, a spring 217 which is bias means for biasing the CS valve element 251 toward the axially right side, that is, toward the CS valve seat 210a is disposed in the space S2.

Next, actions of the capacity control valve V2, mainly actions of opening and closing the CS valve 250 will be described.

First, a non-energized state of the capacity control valve V2 will be described. As shown in FIGS. 7 and 8, in a non-energized state of the capacity control valve V, the CS valve element 251 is pressed to the axially right side by the bias force of the spring 217 so that an axially right end 251a of the large diameter portion 251A of the CS valve element 251 is seated on the CS valve seat 210a to close the CS valve 250. Specifically, the axially right end 251a of the tapered CS valve element 251 is seated on the edge portion of the CS valve seat 210a.

At this time, to the CS valve element 251, the bias force $F_{sp}$ of the spring 217 and force $F_{P1}$ by pressure of the suction fluid to an axially left end surface of the CS valve element 251 are applied to the axially right side and force $F_{P2}$ by pressure of the control fluid to the axially right surface of the CS valve element 251 is applied to the axially left side. That is, given that the right side is the positive side, force $F_{rod}=F_{sp}+F_{P1}-F_{P2}$ is applied to the CS valve element 251.

Next, an energized state of the capacity control valve V will be described. As shown in FIGS. 7 and 9, in the capacity control valve V2, in an energized state, that is, at the time of normal control or so-called duty control, when electromagnetic force $F_{sol}$ generated by applying an electric current to the solenoid 80 exceeds the force $F_{rod}$ (i.e., $F_{sol}$>$F_{rod}$), the movable iron core 84 is pulled toward the axially left side, that is, toward the center post 82 and both the CS valve element 251 and the rod 252 fixed to the movable iron core 84 are moved toward the axially left side so that the axially right end 251a of the CS valve element 251 is separated from the CS valve seat 210a of the valve housing 210 to open the CS valve 250.

In this way, since the suction fluid flows into the space S2 formed on the operation direction side of the CS valve element 251, it is possible to immediately operate the CS valve element 251 by decreasing a drag force applied to the CS valve element 251 when the CS valve 250 is switched from the closed state to the open state. Further, since the control fluid is applied to the axially right surface of the CS valve element 251, it is easy to immediately operate the CS valve element 251 to the axially left side by a pressure difference between the suction fluid and the control fluid applied to the axially left and right surfaces of the CS valve element 251.

The embodiments of the present invention are described above with the drawings. However, specific configurations are not limited to these embodiments but the present invention includes changes and additions within the range not departing from the scope of the present invention.

For example, in the above-described embodiments, a case has been described in which the CS valve element is formed as a member separated from the rod disposed to penetrate the coil 86 of the solenoid 80, but the present invention is not limited to this. The CS valve element and the rod may be integrally formed with each other.

The first embodiment describes that the CS valve seat and the guide hole are integrally formed on the inner peripheral surface of the valve housing. However, the present invention is not limited to this but a valve housing having a CS valve seat and a valve housing having a guide hole may be separately provided.

A guide portion is not limited to be formed in the valve housing but may be formed in part of the insertion hole 82c of the center post 82, for example.

In the above-described embodiments, a case has been described in which the bias means is disposed inside the space, but the bias means may be disposed in a place other than the space such as the solenoid side.

In the first and second embodiments, a case has been described in which the Ps port communicates through the communication passage formed in the CS valve element, but the present invention is not limited to this. The communication passage may be formed in the valve housing. Further, the configuration of the communication passage may be omitted and another Ps port may be formed in the lid member or the valve housing forming the space to communicate with the suction chamber of the variable displacement compressor.

REFERENCE SIGNS LIST

9 Fixed orifice
10 Valve housing
10a CS valve seat
10b Guide hole
11 Ps port
12 Pc port
13 Suction fluid supply chamber
14 Control fluid supply chamber
17 Spring (biasing member)
18 Bellows (biasing member)
50 CS valve
51 CS valve element
51c Communication passage
80 Solenoid
82 Center post
84 Movable iron core
86 Coil
150 CS valve
151 CS valve element
151c Communication passage
210 Valve housing
210a CS valve seat
217 Spring (biasing member)
250 CS valve
251 CS valve element
A, A', B, B' Effective pressure receiving area
Pc Control pressure
Pd Discharge pressure
Ps Suction pressure
S, S1, S2 Space
V, V1, V2 Capacity control valve

The invention claimed is:

1. A capacity control valve comprising:
a valve housing that is provided with a suction port through which a suction fluid of a suction pressure passes and a control port through which a control fluid of a control pressure passes;
a CS valve that includes a CS valve element which is axially driven by a solenoid and a CS valve seat which is provided between the suction port and the control port and is brought into contact with and separated from the CS valve element; and
a biasing member configured to bias the CS valve element in a valve closing direction of the CS valve,
wherein a space is formed inside the valve housing and partially defined by an axial end face of the CS valve element,
the CS valve element is disposed between the space and the solenoid in an axial direction and between the suction port and the space in the axial direction,
the CS valve is configured to open and close a communication between the control port and the suction port,
the suction fluid flows into the space through the suction port,
the CS valve element is provided with a through hole extending in the axial direction, and
the space and the suction port communicate with each other by way of the through hole, and
wherein the space is closed except that the space communicates with the through hole.

2. The capacity control valve according to claim 1, wherein the biasing member is disposed in the space.

3. The capacity control valve according to claim 1, wherein the space and the control port are partitioned by a bellows connected to the CS valve element.

4. The capacity control valve according to claim 1, wherein the space and the control port are partitioned by the CS valve element and the valve housing is provided with a guide hole having an inner periphery which slides on an outer periphery of the CS valve element to guide the CS valve element.

5. The capacity control valve according to claim 2, wherein the space and the control port are partitioned by a bellows connected to the CS valve element.

6. The capacity control valve according to claim 2, wherein the space and the control port are partitioned by the CS valve element and the valve housing is provided with a guide hole having an inner periphery which slides on an outer periphery of the CS valve element to guide the CS valve element.

* * * * *